(12) United States Patent
Hansal et al.

(10) Patent No.: US 11,473,208 B2
(45) Date of Patent: Oct. 18, 2022

(54) ELECTROPOLISHING METHOD AND SYSTEM THEREFOR

(71) Applicant: HIRTENBERGER ENGINEERED SURFACES GMBH, Hirtenberg (AT)

(72) Inventors: Wolfgang Hansal, Markt Piesting (AT); Selma Hansal, Markt Piesting (AT); Rudolf Mann, Vienna (AT); Gabriela Sandulache, Berndorf (AT)

(73) Assignee: Hirtenberger Engineered Surfaces GMBH, Hirtenberg (AT)

( * ) Notice: Subject to any disclaimer, the term of this patent is extended or adjusted under 35 U.S.C. 154(b) by 305 days.

(21) Appl. No.: 16/467,240

(22) PCT Filed: Dec. 7, 2017

(86) PCT No.: PCT/AT2017/060325
§ 371 (c)(1),
(2) Date: Jul. 25, 2019

(87) PCT Pub. No.: WO2018/102844
PCT Pub. Date: Jun. 14, 2018

(65) Prior Publication Data
US 2019/0345628 A1    Nov. 14, 2019

(30) Foreign Application Priority Data

Dec. 9, 2016 (AT) .............. A 51119/2016

(51) Int. Cl.
C25F 7/00 (2006.01)
C25F 3/20 (2006.01)
C25F 3/26 (2006.01)

(52) U.S. Cl.
CPC .......... *C25F 7/00* (2013.01); *C25F 3/20* (2013.01); *C25F 3/26* (2013.01)

(58) Field of Classification Search
CPC ..... C25F 3/20; C25F 3/26; C25F 7/00; B23H 3/10
See application file for complete search history.

(56) References Cited

U.S. PATENT DOCUMENTS

| 3,974,357 A | 8/1976 | Saito et al. |
| 4,421,624 A * | 12/1983 | Kimoto ..................... C25F 7/00 204/209 |
| 4,713,516 A | 12/1987 | Buhler et al. |
| 5,126,525 A | 6/1992 | Kaneko et al. |
| 5,147,995 A | 9/1992 | Chung et al. |

(Continued)

FOREIGN PATENT DOCUMENTS

| DE | 24 12 091 C2 | 9/1983 |
| DE | 34 19 945 C1 | 11/1985 |

(Continued)

OTHER PUBLICATIONS

International Search Report issued in PCT/AT2017/060325 dated Feb. 13, 2018.

(Continued)

*Primary Examiner* — Nicholas A Smith
(74) *Attorney, Agent, or Firm* — Workman Nydegger

(57) ABSTRACT

The invention relates to a method for the electrochemical polishing of metal surfaces by means of repeating pulse sequences, wherein at least one anodic pulse is provided, the current intensity of which rises continuously in the time curve up to a specifiable value. The invention further relates to the use of said method for components produced in 3-D and to a system therefor.

19 Claims, 2 Drawing Sheets

(56) References Cited

U.S. PATENT DOCUMENTS

Figure 1:
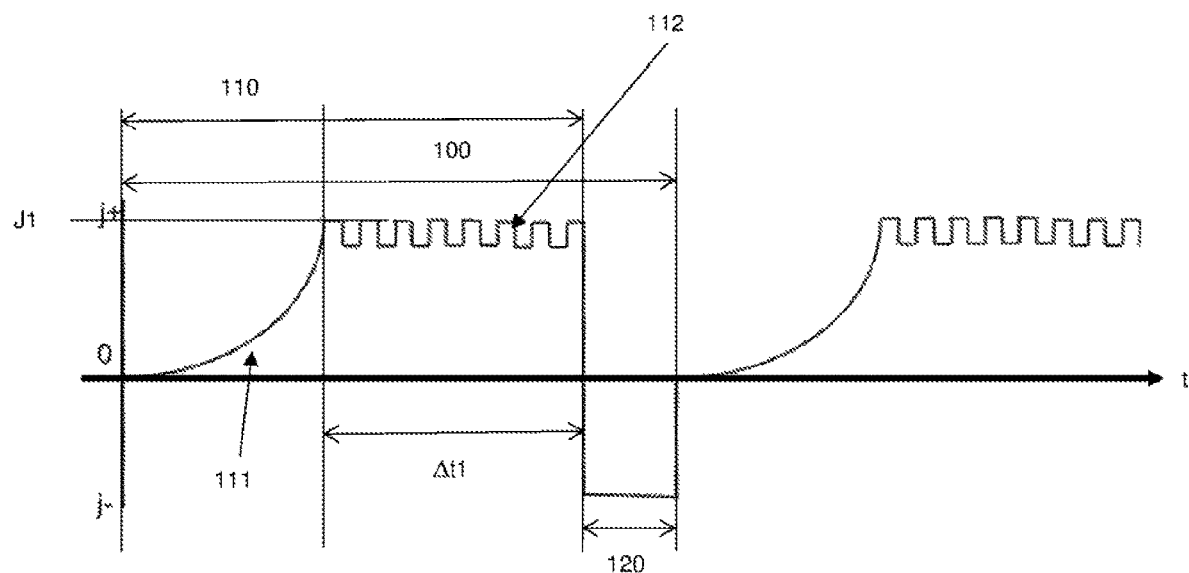

| | | | |
|---|---|---|---|
| 5,539,178 A | 7/1996 | Taneda et al. | |
| 6,143,158 A | 11/2000 | Nishino | |
| 6,558,231 B1 | 5/2003 | Taylor | |
| 8,070,933 B2 * | 12/2011 | Becker | B23H 5/08 |
| | | | 205/647 |
| 2008/0053841 A1 * | 3/2008 | Baertsch | C23C 14/021 |
| | | | 205/640 |
| 2008/0067077 A1 | 3/2008 | Kodera | |
| 2011/0220615 A1 | 9/2011 | Yamada et al. | |
| 2011/0303553 A1 | 12/2011 | Inman | |
| 2013/0233724 A1 * | 9/2013 | Hsu | C25F 5/00 |
| | | | 205/670 |
| 2015/0104665 A1 * | 4/2015 | Beeby | B22F 10/20 |
| | | | 428/548 |
| 2016/0093898 A1 | 3/2016 | Gould | |

FOREIGN PATENT DOCUMENTS

| | | | |
|---|---|---|---|
| DE | 602005005383 | 4/2009 | |
| EP | 1 598 138 | 3/2008 | |
| SU | 1404309 A * | 6/1988 | ............ B24C 1/00 |
| WO | WO 2003/046262 | 6/2003 | |
| WO | WO 2003/088316 | 10/2003 | |
| WO | WO 2005/066395 | 7/2005 | |
| WO | WO 2014/018171 A1 | 1/2014 | |

OTHER PUBLICATIONS

Austrian search report cited in A 51119/2016 dated Jun. 6, 2017.
Written Opinion cited in PCT/AT2017/060325, dated Feb. 13, 2018.

* cited by examiner

ELECTROPOLISHING METHOD AND SYSTEM THEREFOR

The invention relates to an electropolishing method, in particular for metal components produced in 3D printing, wherein at least one component to be machined functions as a first electrode and at least one second electrode is provided as a counter electrode, and at least a partial removal of a portion of the component surface occurs in an electrolyte bath by applying current to the component.

The smoothing of metal surfaces is effected in industrial production by different methods. The final choice of method depends on the initial roughness, and a basic distinction is made between mechanical, chemical and electrochemical methods.

In the electrochemical method of electropolishing the removal is effected by the electrolytic dissolution of metal ions from the workpiece surface, with the purpose of eliminating micro-roughnesses. Electropolishing also serves for deburring, polishing and passivation. A significant advantage of electropolishing is that the workpiece is subjected to virtually no mechanical stress. Hence, this method is particularly suitable for small and delicate parts of almost any size and any shape.

During electropolishing, the workpiece is immersed in an electrolyte, and by applying current, the material on the workpiece (anode) is removed. The metal ions in the electrolyte thereby dissolve, and an inert metal sheet usually serves as the counter electrode (cathode).

For electropolishing, a basic principle to be noted is that the base material is not attacked (etched or stained), and a significant attack on/removal of material does not occur. For conventional electropolishing, the anodic potential is chosen such that it is in the transpassive range of the current-voltage curve. In this range, a so-called "polishing film" forms at the surface of the part, which is responsible for a homogeneous removal of the metal and levels the surface.

During electropolishing, the parts are exposed neither to mechanical nor to high thermal stresses and do not bump against each other. The results can be reproduced with high precision.

In this regard, numerous methods in particular for milled or punched parts are known from the prior art. They are used mainly for health technology and in the food industry. In most cases, standard electrolytes are used for this, which are adapted to the respective material, usually stainless steel, more rarely aluminium or other light metals. In this case, the removal required for the smoothing is controlled only via the composition of the electrolyte or controlled in terms of potential using a direct current.

Furthermore, pulse methods for electropolishing have become known, wherein the desired removal is adjusted via rectangular pulses in repeating pulse sequences.

WO 2014/018171 A1 describes a method for the electrochemical polishing of superconducting high-frequency cavities using pulse methods. A similar method of deburring and electropolishing stents is disclosed in WO 2005/066395 A2. Other methods of electrochemical polishing using pulse methods can also be learnt from WO 2003/088316 A2, WO 2003/046262 A or U.S. Pat. No. 6,558,231 B1.

The methods, which have become known, have the disadvantage that they are not very suitable for workpieces with a heterogeneous formation of surface roughnesses, i.e., areas of high roughness and areas of low roughness on a single workpiece, since each of those individual methods is optimally suited only for a certain roughness range.

It is therefore the object of the invention to provide a method which allows the treatment of the machining of metal parts with different levels of surface roughness and the adjustment of a defined surface roughness.

According to the invention, this object is achieved in that at least one anodic pulse is provided, the current intensity of which displays a steady increase over the course of time up to a specifiable value, wherein the increase is preferably linear, non-linear or exponential. Hence, this anodic pulse does not display a rectangular shape, as it is conventional in the prior art, but its current intensity increases in the course of the pulse duration so that no sudden, but a steady increase in the current intensity in the form of a non-linear slope or a linear ramp over the pulse duration is obtained.

The pulse shape, in particular the speed of the increase and, if applicable, the drop of the current, are responsible for the time course of the formation and the degradation of the polishing film. By selectively controlling the time course of the pulse slope, this essential part of the polishing process can be performed optimally. By controlling the temporal structure of the polishing film, it becomes possible to pass through the areas etching—passivation—polishing during electropolishing in a planned and reproducible manner and, thus, to selectively control the material removal. For metal parts with high roughness, the etching phase can thus be extended by a slowly rising ramp or, respectively, a stepped pulse, thus shortening the process time and improving the result.

In a preferred embodiment of the invention, the pulse displays micropulses subsequent to the increase. In this case, higher-frequency micropulses are "superimposed" on the pulse, the so-called base pulse. The effect of those micropulses is that the polishing process is accelerated, since those micropulses have a disproportionately strong impact at tips and edges in those places due to the field line concentration. In this way, the local current distribution across the workpiece is furthermore influenced as a function of the frequency of the micropulses, which, in turn, is essential for the smoothing effect of the method according to the invention.

Since the electrolytic double-layer capacitance has locally different values on a rough and chemically inhomogeneous surface, as it is usually provided, for example, in a 3D-printed part, the distribution of the current at higher frequencies is different than at lower ones. The reason for this is that the effective resistance of a capacitance decreases as the frequency of the applied current increases so that the higher-frequency portions of the current pulse flow preferentially over places of high capacitance, while the low-frequency portion flows through areas having a low polarization resistance. Thus, the local current distribution on the workpiece can be influenced significantly by the pulse shape.

According to the invention, it is preferably provided that at least one second anodic pulse adjoins the at least one anodic pulse, wherein the at least second pulse is equal to or different from the first pulse, and preferably at least two consecutive anodic pulses and/or pulse sequences are interrupted by a pulse pause and/or by at least one cathodic pulse. Those pulse sequences may exhibit the same or different repeating pulses. In this connection, it is essential that at least one anodic pulse exhibits the steady increase according to the invention, wherein said anodic pulse particularly preferably initiates the pulse sequence, i.e., is located at the beginning thereof.

In a further embodiment of the invention, the pulse frequency may vary with the duration of the method according to the invention due to the progressive smoothing of the component. In this case, the control of the frequency is another influencing value for controlling the removal rate in case of an inhomogeneous initial roughness and usually ranges between 0.2 and 2000 Hz.

Overall, it should be noted that the control of the current or, respectively, voltage signal of the pulses as well as the control of pulse lengths, pulse slopes and pulse pause phases allow the polishing effect to be controlled. In this case, the effect of the pulse slopes is based, on the one hand, on the temporal structure of the effective polishing film, which is controlled by the ramp steepness, and, on the other hand, on the varying frequency spectrum of the pulses that are used.

In this connection, it is provided, depending on the application, that the pulses have an average current density of 0.5 A/dm$^2$ to 30 A/dm$^2$ and the pulses and/or the pulse pauses have a pulse length of 0.0005 s to 5 s.

Furthermore, the electrolyte may contain additional additives, in particular wetting agents, inhibitors and/or complexing agents. The electrolyte usually used in the method according to the invention has a temperature ranging from 5° C. to 90° C. and a pH ranging from 1 to 10. Similarly, it may be provided that the electrolyte is moved periodically or continuously. In the method according to the invention, it is provided in particular that inert cathodes, particularly titanium cathodes, lead cathodes, steel cathodes or stainless-steel cathodes, are used as counter electrodes.

In the method according to the invention, an electrolyte is preferably provided which is selected from the group comprising an electrolyte based on mineral acids or organic acids or a mixture thereof.

Alternatively, the electrolyte can be constructed on the basis of alkalis such as caustic soda, caustic potash or ammonia or, respectively, on the basis of basic organic compounds such as amines.

Upon completion of electropolishing, a post-treatment and/or a coating step preferably follow(s) subsequently. The post-treatment usually involves the removal of electrolyte residues and reaction products and, optionally, a drying of the machined component.

By adjusting the desired surface roughness by means of the electropolishing according to the invention, the machined component is prepared especially for a subsequent coating step. In particular, this coating step may include methods which comprise electroplating, PVD or CVD coating, polymer coating or plasma electrolytic oxidation.

The method according to the invention has proved its worth notably in the use for metal components produced in 3D printing.

In this case, a cleaning occurs in a first step, electrochemical polishing in a second step, and a post-treatment of the component in a third step.

In addition to the removal of contaminants, in particular oils, fats and oxides, the cleaning furthermore comprises a mechanical pre-polishing in case of higher roughnesses and inhomogeneous topographies and/or staining of the component in order to achieve a more homogeneous removal.

In a particularly preferred embodiment of the invention, a detection and digitization is initially provided before the component to be machined is cleaned. Subsequently, the component is treated by means of wet blasting, preferably with the aid of a jet system with rigid or movable nozzles, in order to remove any supporting structures. This is followed by a grinding step in particular by means of vibratory finishing or, respectively, drag finishing. Subsequently, electrochemical polishing of the prepared component is effected.

Upon completion of electropolishing, additional plasma polishing is required in some areas of application, which may be followed by further post-treatment steps and optionally coatings.

In this case, the above-described steps for machining, in particular, 3D-printed components may partly occur also simultaneously, that is, in one process step.

After detecting the geometry and surface finish of the component to be machined at a first station, the supporting structures, if present, are removed at a second station by wet blasting under potential, and/or the macro-roughness of the surface is reduced by vibratory finishing in order to achieve a suitable surface for the further step of electropolishing.

Prior to the electropolishing, the parts are cleaned in a stain and then rinsed with water. The pre-cleaned parts were then immersed in the electropolishing solution and anodically switched. In doing so, the operating parameters during electropolishing (electropolishing solution, temperature, current signal) are adapted to the respective substrate material.

The resulting surfaces meet the requirement in terms of surface roughness for the given application, further machining is not required therefor. However, depending on the application, a further functionalization of the surface in the form of a coating or an additional surface treatment may occur.

The method according to the invention is suitable in particular for components made of steel, nickel-based alloys, aluminium alloys, magnesium alloys or titanium alloys.

The invention is explained in further detail below by way of non-limiting examples with accompanying figures. Therein, FIG. 1 shows a typical pulse sequence for electropolishing, FIG. 2 shows a device according to the invention.

Figure 3:
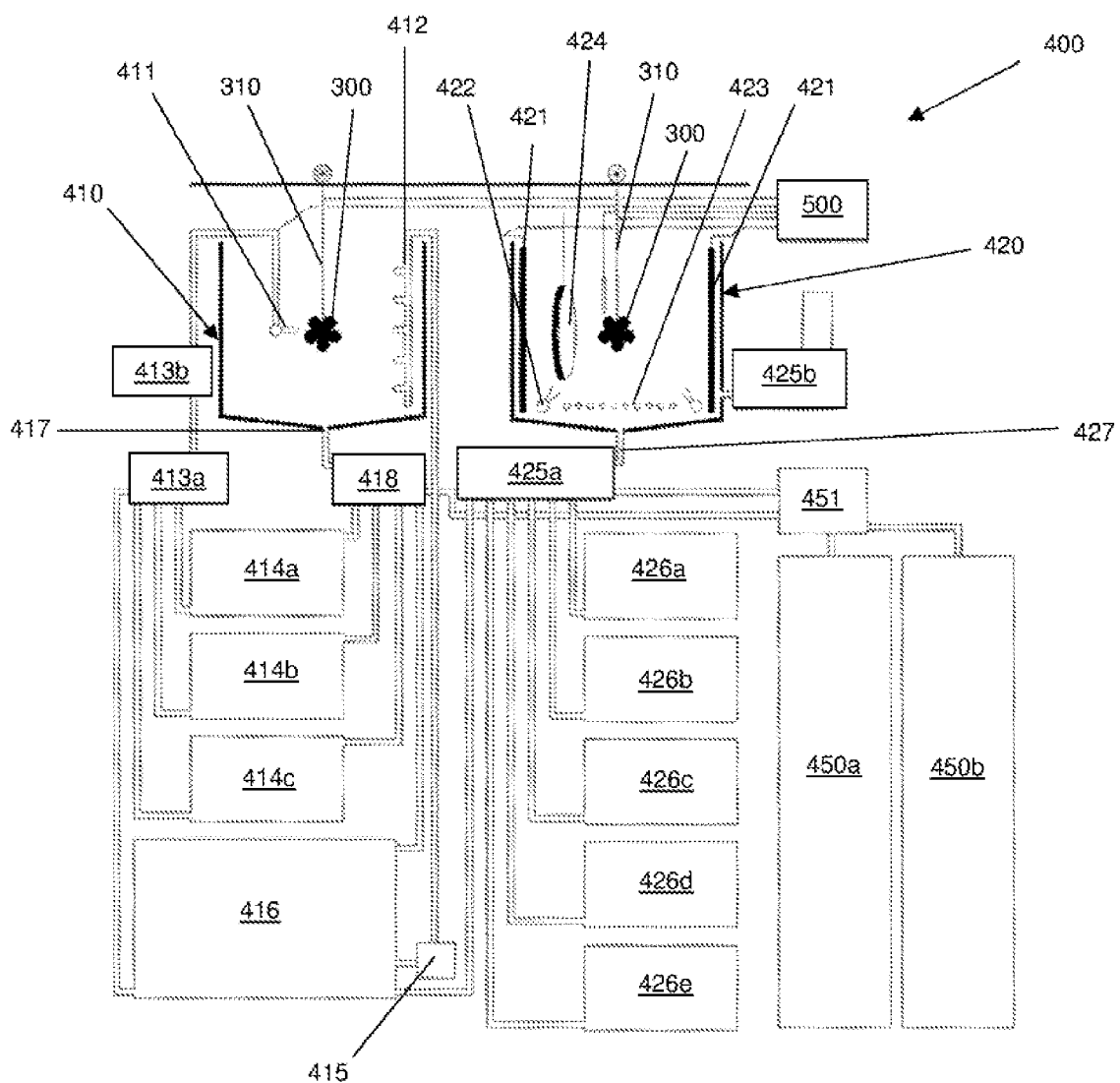

FIG. 3 shows a further preferred embodiment of the plant according to the invention.

Figure 2:
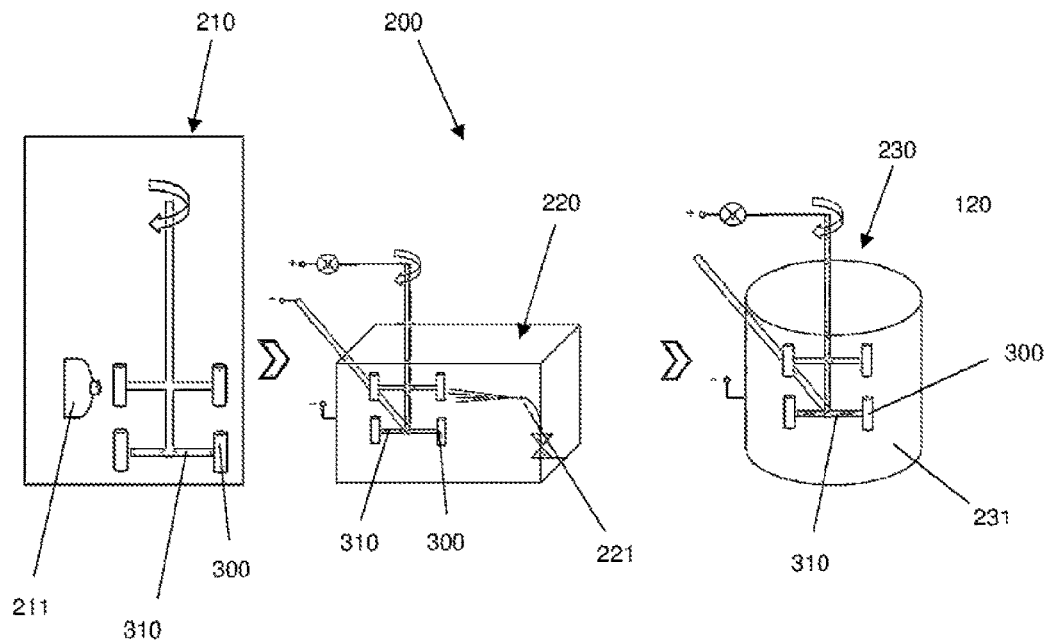

As illustrated in FIG. 1, a typical pulse sequence 100 according to the invention consists of an anodic pulse 110, the current intensity j+ of which displays a steady increase 111 over the course of time up to a specifiable value J1. This anodic pulse 110 maintained over a certain time Δt1 is superimposed with micropulses 112, i.e., higher-frequency multipulses. A cathodic pulse 120 in rectangular shape adjoins this anodic pulse 110.

This pulse sequence 100 consisting of an anodic pulse 110 and a cathodic pulse 120 is repeated until the desired removal and, associated therewith, the desired surface quality are achieved. The duration and magnitude of the steady increase 111, namely the slope or, respectively, ramp, depends on the initial roughness and the consequent necessary etching time. Number and height of the micropulses 112 are material-dependent.

Exemplary applications of using the method according to the invention for 3D-printed parts are exemplified below.

EXAMPLE 1: SMOOTHING A COMPONENT MADE OF AN ALUMINIUM ALLOY

A 3D-printed component made of AlMgSi10 with supporting structures exhibits an initial roughness Ra=100 μm.

The component is treated as follows:

1.1. Cleaning of the component, in particular degreasing and rinsing.

1.2. Removal of the supporting structures by electrochemically assisted wet blasting and subsequent rinsing with ultrasonic support.

1.3. Deburring by means of electrochemically supported etching and another rinsing.

1.4. Smoothing of the surface of the component by means of the method according to the invention.

In this case, the anodic pulse consists of a ramp having a voltage of 0 V to 5 V and rising and a subsequent voltage plateau with micropulses of 5 V to 20 V at a frequency of 5 Hz.

In this case, an electrolyte consists of:
68% by vol. of polyphosphoric acid
20% by vol. of n-butanol
20 g/l ammonium hydrogen difluoride
5 g/l ethanolamine
water The operating temperature is 80° C.

1.5. Rinsing
1.6. Drying

By this surface treatment, the roughness of the machined component is reduced by a factor of 100 to Ra=1.0 μm.

EXAMPLE 2: SMOOTHING A COMPONENT MADE OF A TITANIUM ALLOY (Ti6Al4V)

A 3D-printed component made of a titanium alloy having an initial roughness of RA=14 μm is treated as follows:

2.1. Cleaning of the component, in particular degreasing and rinsing.

2.2. Deburring by means of electrochemically supported etching and another rinsing.

2.3. Smoothing of the surface of the component by means of the method according to the invention.

In this case, the anodic pulse consists of a ramp having a voltage of 0 V to 3 V and rising and a subsequent voltage plateau with micropulses of 3 V to 12 V at a frequency of 5 Hz. The pulse sequence consists of 10 repeats of the anodic pulse and a subsequent cathodic rectangular pulse having 15 V.

The electrolyte consists of:
25% by vol. of sulfuric acid
15% by vol. of hydrofluoric acid
60% by vol. of glacial acetic acid The temperature of the electrolyte bath is at room temperature.

1.5. Rinsing
1.6. Drying

By this surface treatment, the roughness of the machined component is reduced by a factor of 17 to Ra=0.5 to 0.8 μm.

EXAMPLE 3: SMOOTHING A CAST PART MADE OF A MAGNESIUM ALLOY

A cast part made of a magnesium alloy (AZ91) having an initial roughness of Ra=8 μm is machined according to the invention as follows:

3.1. Pre-treatment as in the previous examples 3.2. Smoothing of the surface by means of the method according to the invention of pulse electropolishing.

The pulse consists of the following signal path: (a) ramp with a voltage of 0-20V and rising, (b) starting from the final voltage, application of micropulses with a voltage signal of 12 V to 20 V at a frequency of 2 Hz.

In this case, the electrolyte consists of:
45% by vol. of phosphoric acid
35% by vol. of ethanol
water The operating temperature is between 30° C. and 50° C.

3.3. Rinsing
3.4. Drying

The roughness was reduced by a factor of 16 to Ra=0.5 μm in the course of the entire process.

EXAMPLE 4: SMOOTHING A COMPONENT MADE OF A MAGNESIUM ALLOY

A 3D-printed component made of a magnesium alloy having an initial roughness of Ra=50 μm was machined according to the invention.

4.1. Pre-treatment as in the previous examples 4.2. Electrochemically supported wet blasting and then ultrasonic supported rinsing 4.3. Deburring by electrochemically supported etching and then rinsing 4.4. Smoothing of the surface by means of pulse electropolishing.

The pulse consists of the following signal path: (a) ramp with a voltage of 0-25 V and rising, (b) starting from the final voltage, application of micropulses with a voltage signal of 12 V to 25 V at a frequency of 2 Hz.

In this case, the electrolyte consists of:
45% by vol. of phosphoric acid
35% by vol. of ethanol
water The operating temperature is between 30° C. and 50° C.

By the method according to the invention, the roughness is reduced by a factor of 50 to Ra=1 μm.

In a further step, a post-treatment of the smoothed surface follows, namely a ceramic coating by means of plasma electrolytic oxidation:

4.5. Rinsing
4.6. Plasma electrolytic oxidation (PEO)
4.7. Rinsing
4.8. Drying

EXAMPLE 5: SMOOTHING A STEEL PART

A 3D-printed workpiece made of steel (1.4401) having an initial roughness of Ra=50 μm is machined according to the invention:

5.1. Pre-treatment and then rinsing 5.2. Electrochemically supported wet blasting and then ultrasonic supported rinsing 5.3. Deburring by electrochemically supported etching and then rinsing 5.4. Smoothing of the surface by means of pulse electropolishing according to the invention.

The pulse consists of the following signal path: (a) ramp with a voltage of 0-6 V and rising, (b) starting from the final voltage, application of micropulses with a voltage signal of 2.5 V to 6 V at a frequency of 10 Hz, wherein the pulse sequence exhibits 5 repeats of the anodic pulse and of a subsequent currentless pause. This pulse sequence is also repeated.

The electrolyte consists of:
70% by vol. of phosphoric acid
20% by vol. of sulfuric acid
8% by vol. of PEG
water
The operating temperature is 45-55° C.
5.5. Rinsing
5.6. Drying
The surface roughness is reduced by a factor of 50 to Ra=1 μm.

EXAMPLE 6: SMOOTHING A STEEL PART

A 3D-printed part made of steel (1.4401) having an initial roughness of Ra=50 μm is machined according to the invention as in Example 5, followed by a post-treatment step by means of plasma electropolishing.

The roughness is thereby reduced by a factor of 500 to Ra=0.1 μm.

In FIG. 2, a plant 200 for implementing the method according to the invention is illustrated schematically.

At a first detection station 210, the components 300 to be treated are captured digitally with the aid of a camera 211. In doing so, particularly the surface and the geometry of the respective component 300, which is disposed on a fixture 310, are recorded and evaluated.

Subsequently, the fixture 310 is transferred to a second machining station 220. This pre-machining or pre-treatment of the components 300 may comprise:
1. Pre-treatment
1.1. Degreasing
1.2. Rinsing
2. Removal of the supporting structures
2.1. Electrochemically supported wet blasting
2.2. Ultrasonic supported rinsing
3. Deburring
3.1. Electrochemically supported etching
3.2. Rinsing
4. Preliminary smoothing (optional)
4.1. Electrochemically supported vibratory finishing
4.2. Ultrasonic supported rinsing One possibility of improving the effect of mechanical grinding and deburring is to carry out the grinding process in an electrolyte while applying an anodic potential. In this method, the mechanical and chemical removal processes support each other so that, on the one hand, a shorter process time is required and, on the other hand, the quality of the ground workpiece is higher. On the basis of adequately chosen electrode configurations, it is possible to smooth and deburr also internal parts. If only the exterior surfaces have to be smoothed, the process can also be carried out simultaneously for several parts in one drum.

At the machining station 220 illustrated in FIG. 2, the pre-treatment of the components 300 is effected by electrochemically supported wet blasting using a jet system 221, wherein the fixture 310 and hence also the components 300 are electrically contacted.

Said pre-treatment is now followed by the actual step of electropolishing at the electropolishing station 230, wherein this station is designed as an electrolyte bath 231 in which the components 300 are submerged. In this case, the electrolyte can have the composition as indicated in the exemplary applications and, optionally, additional additives such as, e.g., grinding bodies.

Subsequently, a post-treatment may optionally be provided, such as, for example, plasma polishing, which preferably takes place at the machining station 220.

Between the individual steps of pre-treatment, electropolishing and post-treatment, cleaning steps, especially also rinsing steps, are also provided always.

After those steps, which are performed directly one after the other in a closed plant in a fully automated fashion, further surface finishing may be conducted. This may be done either wet-on-wet, which is suitable especially for galvanic procedures (plasma electrolytic oxidation (PEO), electroplating, chemical plating), or else by means of currentless methods (painting, sealing).

A further preferred embodiment of the plant according to the invention can be seen in FIG. 3.

In this plant 400, which is implemented as a fully automated processing line, a first machining station 410, namely a jet tank, is again provided, in which a pre-treatment of a workpiece or component 300, which is disposed on a workpiece suspension 310, is performed. This workpiece suspension 310 permits movement of the workpiece 300 in all three spatial directions, as well as a rotation of the workpiece 300 about its own vertical axis within the first machining station 410. Likewise, the workpiece suspension 310 serves for the automated transport of the workpiece 300 to a subsequent second machining station 420. In addition, the workpiece 300 is electrically contacted via the workpiece suspension 310.

At the first machining station 410, a movable nozzle 411 is arranged, which is also electrically connected to a pulse generator 500. By means of this nozzle 411, which is movable back and forth and pivotable upwards and downwards, the workpiece 300 is cleaned specifically. In particular, this structure allows electrochemical wet blasting for removing supporting structures and/or ridges, which appear virtually always during 3D printing of particularly complex components. For rinsing the workpiece 300, flushing nozzles 412 are provided within the jet tank 410.

The first machining station 410 serves not only for the pre-treatment of the workpiece 300, but can also be used after electropolishing for further cleaning steps and/or post-treatments of the workpiece 300. For this purpose, it is provided that the movable nozzle 411 can be supplied with different media. Thus, a manifold and pumping system 413a is provided which communicates with different storage containers 414a, 414b, 414c, for example, for a wet grinding electrolyte, for a PEO electrolyte and for a plasma polishing electrolyte.

Between the movable nozzle 411 and the manifold and pumping system 413a, a control and filtering device 413b is furthermore arranged, which optionally filters the medium supplied to the movable nozzle 411 in order to prevent clogging of the movable nozzle 411, and also tempers the medium, if necessary.

For the supply of the flushing nozzles 412, a pumping system 415 and a rinse water reservoir 416 are likewise provided.

The first machining station 410 furthermore includes a return 417 which allows recirculation of the medium used into the respective storage container 414a, 414b, 414c, 426 via a further manifold unit 418, or discharging into a collection container 450a for acidic waste water or into a collection container 450b for alkaline waste water.

At the second machining station 420, which is a dip tank, counter electrodes 421, usually steel electrodes, electrically connected to the pulse generator 500, are arranged in the electrolyte bath. During electropolishing, the electrolyte is circulated via a circulation system 422, and its temperature is controlled via temperature sensors 423. Furthermore, an ultrasonic transmitter 424 is arranged in the dip tank 420, which permits ultrasound support of the respective process as needed.

The second machining station 420 is also supplied with different electrolytes from the storage containers 426a, 426b, 426c, 426d, 426e via a further second manifold and pumping system 425a. Furthermore, a filter pump 425b, which communicates with the circulation device 422, is arranged at the dip tank 420.

Similarly, the return 427 of the second machining station communicates with the storage containers 426a, 426b, 426c, 426d, 426e as well as the collection containers 450a, 450b for waste water via the further manifold and pumping system 425a, with a distributor valve 451 regulating the discharge of the waste water as a function of its pH value.

The second machining station 420 is arranged in particular for electropolishing. Likewise, degreasing, deburring, plasma polishing and/or a plasma electrolytic oxidation may also be performed on the workpiece 300 at this station.

The plant 400 as shown in FIG. 3 consists of two machining tanks 410, 420 in which the various machining steps are carried out as described in the examples. In this case, the plant 400 is controlled fully automatically with a commercially available programmable logic controller (not shown).

The pulse generator 500 is able to output any programmed current sequences, in particular direct current, alternating current, rectangular pulses, pulses with freely programmable slopes and micropulses that have been superimposed.

The machining tanks 410, 420 are equipped with level sensors and temperature sensors; the plant 400 is also provided with additional sensors, e.g., position sensors for the workpiece suspension 310, a sensor for the presence of the workpiece 300 in the suspension, motor sensors and the like, for detecting faulty operating conditions and alerting the operator as needed.

The storage containers 414a, 414b, 414c, 416, 426a, 426b, 426c, 426d, 426e can be thermostated as needed in order to keep the process times as short as possible.

A typical process sequence is described below:

The workpieces 300 coming from the 3D printers are connected to a base plate for process reasons and have to be separated therefrom in a first work step by means of spark or, respectively, wire erosion. This is a common post-treatment step in the production of workpieces 300 in 3D printing. Subsequently, the loose parts 300 are introduced into an entrance gate (not illustrated) of the plant 400 according to the invention.

In the entrance gate, the parts 300 are automatically aligned with the aid of digital image processing and clamped onto an adequate receptacle.

This is followed by the individual steps of the method according to the invention.

1. Degreasing in the dip tank 420

The dip tank 420 is filled from the storage container 426a with a degreasing electrolyte and brought to the process temperature. Subsequently, the workpiece 300 is dipped into the electrolyte and degreased with or without electrolytic support. Upon completion of the degreasing step, the degreasing electrolyte is pumped back into the storage vessel 426a, and the workpiece 300 is transferred into the jet tank 410 to be rinsed therein with demineralised water from the spray nozzles 412.

2. Electrochemically supported wet blasting in the jet tank 410

The supporting structures required for 3D printing are removed during this process step. The combined movability of the workpiece suspension 310 and the jet nozzle 411 allows selective machining of any desired point of the workpiece 300. For example, it is possible to treat different types of supporting structures with customized pulse currents.

Subsequently, the workpiece 300 is again transferred into the second machining station 420.

3. Electrochemical deburring in the dip tank 420

As a next step, remains of the supporting structures, which were not removable in the previous step, as well as coarse roughnesses are eliminated. The dip tank 420 is filled with the deburring electrolyte from the storage container 426b, is brought to the process temperature, the workpiece 300 is immersed, and the process is carried out.

The next machining step also occurs at the second machining station 420.

4. Pulse electropolishing in the dip tank 420

The dip tank is filled from the storage vessel 426c with the polishing electrolyte and brought to the process temperature. The workpiece 300, which previously has been wet blasted, is dipped into the polishing electrolyte, and the polishing process is carried out. Thereupon, the electrolyte is pumped back into the storage vessel 426c, and the workpiece 300 is again cleaned in the jet tank 410 with demineralised water from the spray nozzles 412.

5. Plasma polishing

Depending on the requirement, this step can be carried out in the dip tank 420 or in the jet tank 410. In the latter case, it is possible to polish individual spots of the workpiece 300 selectively.

6. PEO coating

This step can be applied to the entire workpiece 300 likewise in the dip tank 420 or to individual spots of the workpiece 300 in the jet tank 410.

It is understood that the exemplary embodiments described above are not to be considered as limiting. Thus, different electrolytes can be used depending on the material of the components. Likewise, different machining steps can be provided before and/or after pulse electropolishing. To this end, further stations such as, e.g., a wet grinding station and/or a machining tank can be provided in the plant, which preferably operates in a fully automated fashion, besides the two machining stations as described.

The invention claimed is:

1. An electropolishing method for metal components, wherein at least one component to be machined functions as a first electrode and at least one second electrode is provided as a counter electrode, and at least a partial removal of a portion of the component surface occurs in an electrolyte bath by applying current to the component, wherein the current is applied in the form of repeating pulse sequences, wherein at least one anodic pulse is provided, wherein the at least one anodic pulse has a current intensity that displays a steady increase over the course of time up to a specifiable value, wherein the anodic pulse displays micropulses subsequent to the increase.

2. A method according to claim 1, wherein at least one second anodic pulse adjoins the at least one anodic pulse, wherein the at least first pulse and the at least second pulse form a repeating pulse sequence.

3. A method according to claim 2, wherein the at least second pulse is different from the first pulse.

4. A method according to claim 2, wherein the repeating pulse sequence is interrupted by a pulse pause, a cathodic pulse or a combination thereof.

5. A method according to claim 2, wherein pulse pauses have a pulse length of 0.0005 s to 5 s.

6. A method according to claim 1, wherein the pulses have an average current density of 0.5 A/dm$^2$ to 30 A/dm$^2$.

7. A method according to claim 1, wherein the pulses have a pulse length of 0.0005 s to 5 s.

8. A method according to claim 1, wherein an electrolyte is provided which has a pH ranging from 1 to 10.

9. A method according to claim 8, wherein the electrolyte contains additional additives selected from the group consisting of wetting agents, inhibitors, complexing agents, and mixtures thereof.

10. A method according to claim 8, wherein the electrolyte is moved periodically or continuously.

11. A method according to claim 1, wherein inert cathodes are used as counter electrodes.

12. A method according to claim 1, wherein ultrasound support is additionally provided.

13. A method according to claim 1, wherein the metal components are produced in 3D printing.

14. A method according to claim 1, wherein the at least one component to be machined is treated by means of wet blasting in order to remove any supporting structures before it functions as a first electrode.

15. A manufacturing system, comprising at least one first machining station for the pre-treatment of metal components which have been produced in 3D printing, with at least one second machining station being provided,
   wherein the manufacturing system comprises a controller and a pulse generator,
   wherein the second machining station comprises a dip tank, counter electrodes electrically connected to the pulse generator, wherein the pulse generator is able to output any programmed current sequences, wherein in the dip tank of the second machining station, the manufacturing system is configured to perform the following:
      at least one of the metal components functions as a first electrode and at least one second electrode is provided as a counter electrode, and at least a partial removal of a portion of the component surface occurs in an electrolyte bath by applying current to the component,
      the current is applied in the form of repeating pulse sequences,
      at least one anodic pulse is provided, wherein the at least one anodic pulse has a current intensity that displays a steady increase over the course of time up to a specifiable value, and
      the anodic pulse displays micropulses subsequent to the increase.

16. The manufacturing system according to claim 15, wherein a detection station for detecting the geometry and surface finish of the components to be machined is additionally provided.

17. The manufacturing system according to claim 15, wherein the first machining station and the second machining station are additionally arranged for the post-treatment of the components.

18. The manufacturing system according to claim 15, wherein said first machining station for the pre-treatment of metal components comprises
   a jet tank which is disposed on a workpiece suspension permitting movement of the workpiece in all three spatial directions, as well as a rotation of the workpiece about its own vertical axis within the first machining station and
   a movable nozzle, which is electrically connected to a pulse generator, wherein said nozzle is movable back and forth and pivotable upwards and downwards.

19. An electropolishing method for 3D-printed metal components for removing supporting structures or ridges,
   wherein a 3D-printed metal component is placed in a first machining station with a movable nozzle, which is electrically connected to a pulse generator,
   wherein said nozzle is movable back and forth and pivotable upwards and downwards, wherein the 3d-printed metal component is cleaned with said movable nozzle,
   wherein supporting structures or ridges of the 3d-printed metal component are removed by electrochemical wet blasting,
   wherein at least one of the 3D-printed metal components functions as a first electrode and at least one second electrode is provided as a counter electrode, and at least a partial removal of a portion of the component surface occurs in an electrolyte bath by applying current to the component,
   wherein the current is applied in the form of repeating pulse sequences,
   wherein at least one anodic pulse is provided, wherein the at least one anodic pulse has a current intensity that displays a steady increase over the course of time up to a specifiable value, and
   wherein the anodic pulse displays micropulses subsequent to the increase.

\* \* \* \* \*